Figure 1:
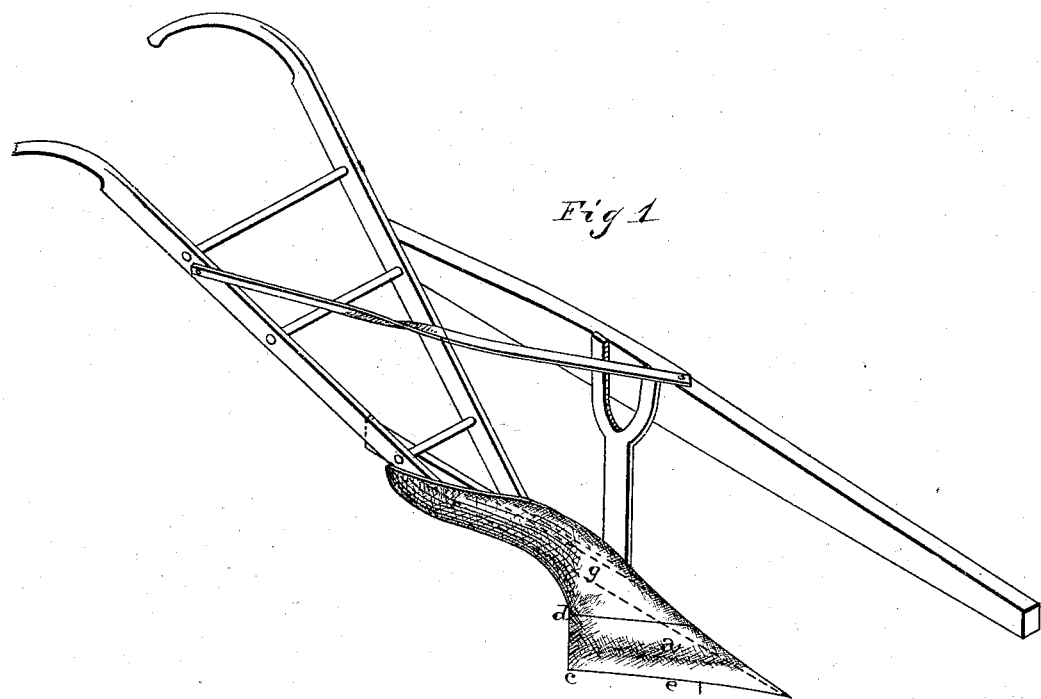
Figure 2:
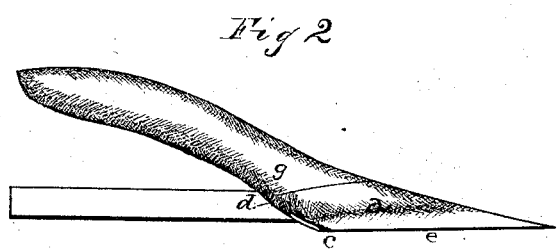

E. CARTWRIGHT.
Plows.

No. 144,255. Patented Nov. 4, 1873.

Witnesses
E. a. Knight
F. A. Lehmann

Inventor
E. Cartwright

UNITED STATES PATENT OFFICE.

EDWARD CARTWRIGHT, OF DE WITT, NEBRASKA.

IMPROVEMENT IN PLOWS.

Specification forming part of Letters Patent No. 144,255, dated November 4, 1873; application filed October 18, 1873.

*To all whom it may concern:*

Be it known that I, EDWARD CARTWRIGHT, of De Witt, in the county of Saline and State of Nebraska, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in plows adapted especially to turning the sod on the prairies; and it consists in the peculiar convex curve or shape of the point and mold-board, so that the sod will be displaced with the least possible amount of friction and wear upon the plow, as will be more fully described hereafter.

The accompanying drawing represents my invention.

$a$ represents the lay or cutting-point, which is detachably secured to the frame-work of the plow by any suitable devices. The cutting-edge of this point extends backward to the point $c$ at an angle of about forty-five degrees, and then the outer end is cut away so that the lay is shorter at the point $d$, where it joins the mold-board $g$, than at the point $c$. Along the cutting-edge $e$ the lay is intended to be perfectly flat, but about its middle it begins to curve upward, so as to be convex, or rounding. The mold-board curves backward in the usual manner, being wider at its front end, where it joins the lay, than at any other point, and is made convex its entire length. The convexity is greatest near the center, where the sod begins to fall over. By making the lay convex the sod begins from the very first of the cut to be raised upward in the center, so as to lift its weight from off the land-side edge, so that the sod scours lightly over the mold-board, wearing every part just alike, and thus prevents the edges from wearing away as rapidly as they always do in those plows where the lay or mold-board is made concave.

Having thus described my invention, I claim—

The point or lay $a$, having a flat cutting-edge and a convex surface, in combination with the mold-board $g$, made convex its entire length, and contracting and diminishing in width to its termination, substantially as shown and described.

In testimony that I claim the foregoing I have hereunto set my hand this 18th day of October, 1873.

EDWARD CARTWRIGHT.

Witnesses:
F. A. LEHMANN,
ELIHU HUNT.